July 10, 1962 R. H. WILMER 3,043,643

TELEPHONE WIRING SUPPORT FOR DESKS

Filed May 16, 1960 2 Sheets-Sheet 1

INVENTOR

R.H. WILMER

BY

ATTORNEY

INVENTOR
R. H. WILMER
BY
ATTORNEY

United States Patent Office 3,043,643

Patented July 10, 1962

3,043,643

TELEPHONE WIRING SUPPORT FOR DESKS

Rudolph H. Wilmer, Youngstown, Ohio, assignor to The General Fireproofing Company, Youngstown, Ohio, a corporation of Ohio Filed May 16, 1960, Ser. No. 29,232
2 Claims. (Cl. 312—194)

This invention relates to an improvement in telephone wire accessories for desks and more particularly to supports arranged to removably mount a terminal block to a fixed portion of the desk, preferably, for example, in the hooded or concealed area of the knee space of a double or single pedestal desk.

Office buildings as now constructed usually provide appropriate telephone wiring outlets near the planned location of the desks. The purpose of this arrangement is not only to reduce the amount of labor and time required of a telephone installer, but also to avoid exposing unnecessary and annoying length of lead cord, and in addition to provide convenience to the user of the desk.

While it has long been the practice to provide knockout hole areas in a side wall of a desk pedestal through which telephone wires, light wires, or the like can be passed, nevertheless, it is particularly desirable that the desk itself at the time it is manufactured be so constructed as to support a wood or similar terminal block which may be readily removed to facilitate attachment of the necessary wires and then readily replaced as a part of the final step in connecting the usual telephone cord leading to the telephone instrument itself.

Accordingly, the object of the present invention is to provide suitable supports for the block which may be conveniently mounted on a fixed wall of the relatively enclosed knee space area of the desk, adjacent the modesty panel, but in no way connected thereto, so that when this panel is disconnected and removed by a simple operation, the wiring block will be readily accessible. The supports for the block may be disposed vertically or horizontally on a double pedestal desk, but, in their horizontal position, when there is no modesty panel as on a single pedestal desk, they are especially useful. In any event, they are immovably secured to a permanent wall portion forming the knee space enclosure.

With the above and other objects in view which will appear as the nature of the invention is better understood, the invention consists in the novel construction, combination, and arrangement of parts, hereinafter more fully described, illustrated and claimed.

A preferred and practical embodiment of the invention is shown in the accompanying drawings, in which:

FIGURE 1 is a front elevation of a double pedestal desk, showing the so-called modesty panel in place and the location of the wire support in dotted lines.

FIGURE $1^a$ is a detail perspective view of a portion of a desk panel, a portion of the modesty panel and the wiring support.

Figures 3, 4, 5:
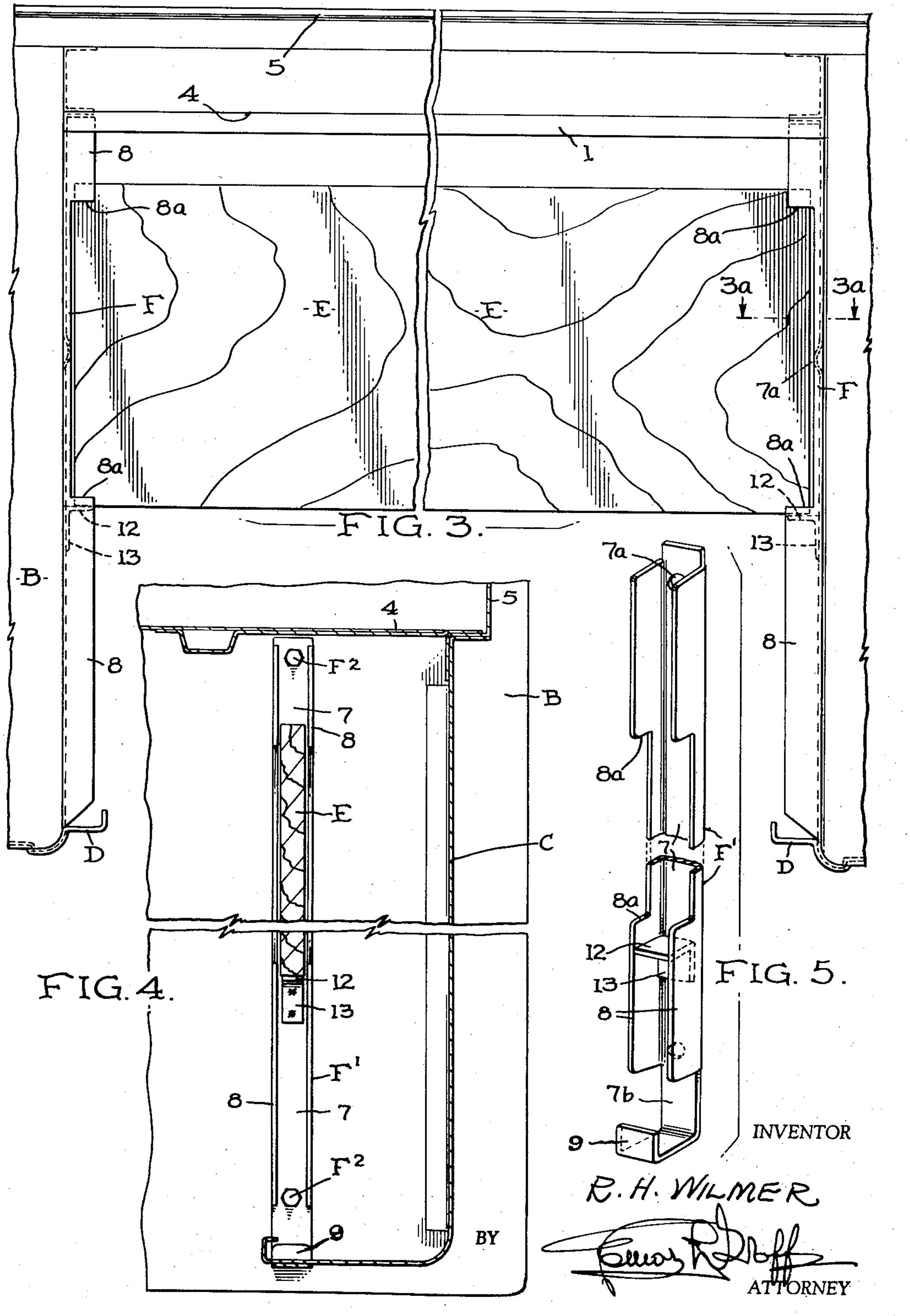
FIGURE 3 is a modified elevation of FIGURE 2 showing the exposed wiring support, the modesty panel being removed.

FIGURE $3^a$ is a cross-sectional view taken on the line $3^a$—$3^a$ of FIGURE 3.

FIGURE 4 is a detail vertical sectional view illustrating a modification of the block supports shown in FIGURE 3, and wherein said supports are fixed directly to an inside pedestal wall within the knee space.

FIGURE 5 is a perspective view of the support shown in FIGURE 4.

Similar reference characters designate corresponding parts throughout the several figures of the drawings.

Figure 1:
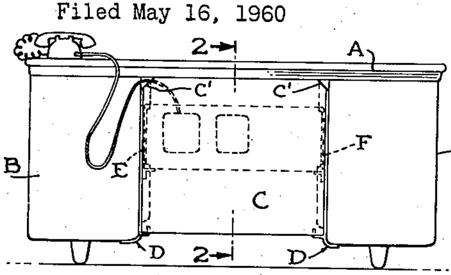
Figures 1A, 2, 3A:
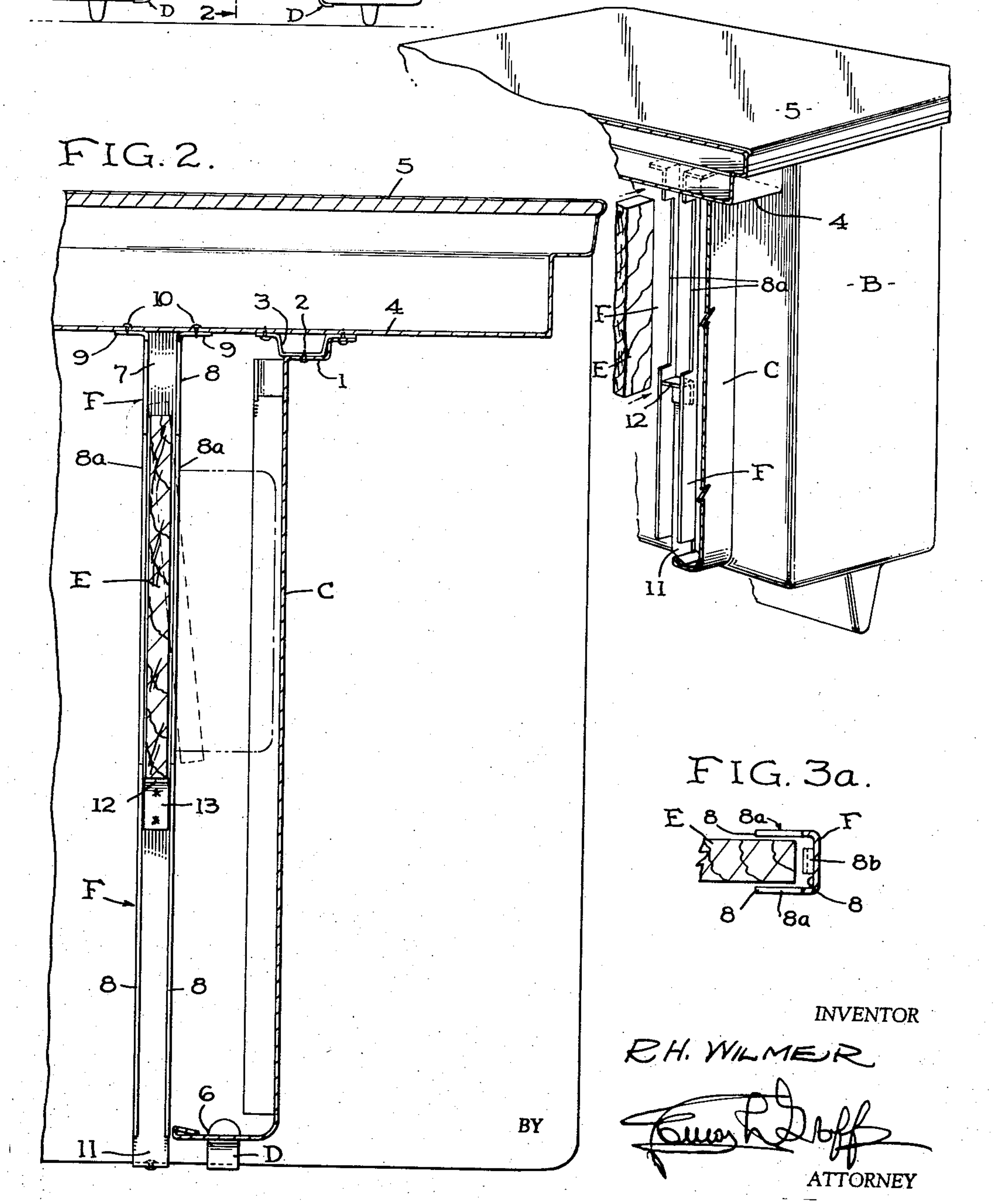
FIGURE 2 is a vertical sectional view taken on the line 2—2 of FIGURE 1 showing one of the vertical supports for the wiring terminal block with its upper end portion secured to the under surface of the center drawer housing, and its lower end secured to the bottom wall of the pedestal.

Referring first to FIGURE 1 of the drawings, it will be observed that the desk includes a top A, one or more pedestals B and a so-called modesty panel C supported at the usual location between the inner walls of the pedestals B—B at the front of the desk and defining the forward limit of the knee space for the desk. Some desks do not require a modesty panel as where they are not facing an entrance, an aisleway or the like, as for example, when they are disposed parallel in long rows.

Where the panel C is used, it may be supported at its lower end between the pedestal side walls by the brackets D. One end of each bracket is secured to the bottom wall of a related pedestal and the other arm is turned inwardly to support the panel C as shown in FIGURES 1 and 2.

The upper end of the panel C has its corners C′ formed relative to its top and side edges to provide cord openings, and, is also provided with an outwardly offset flange 1 connected by suitable screws or like fastenings 2 to the channel 3 secured to the wall 4 defining the bottom wall of the center drawer compartment and lying beneath the usual working top 5. Although the corners C′ are shown as oblique, they may be round or any other geometrical formation.

The lower end of the panel C is provided with an inturned slotted flange 6 which rests upon the out-turned arms of the brackets D. This flange has a hole (not shown) through which a service wire may pass.

The wiring block E made of wood, plastic or other similar material is supported inwardly of the rear face of the modesty panel C, a distance to accommodate an instrument box, as shown by dotted lines, and is mounted on a support including opposite inwardly facing vertical channels F having bottom walls or webs 7 and side flanges 8—8 which are angularly offset at 9 (FIG. 2) at their upper end to be secured by fastenings 10 to the horizontal wall 4 of the desk top assembly. The bottom of the channel may, as shown in FIG. $3^a$, be provided with an inwardly projecting blister or extrude $7^a$ to frictionally engage the sides of the block E and reduce undue play.

As will be seen from FIGURES 2 and 3, the lower portion of the web of the channel which projects beyond the flanges is turned backwardly as indicated at 11 to be secured to the bottom face of the related pedestal side wall. Thus, in these figures of the drawings the channels are secured to both the underside 4 of the desk top and also to the pedestals. Each channel F has a portion of its flanges 8 cut away as indicated at $8^a$, and, at the lower end of each cutaway portion, there are provided block stops 12. If these stops are separate angles their flanges 13 can be welded to the bottom 8 of the related channel. These stops 12 may be a horizontal part extruded from the web 7, or they may even be a screw whose head projects into the channel. This channel is of universal application in the sense that it may be used as a "right" or "left."

The terminal block E is of a length equal to the distance between the webs 8 of opposed facing channels F and is intended to be inserted between the flanges $8^a$—$8^a$ by first moving the same inwardly and upwardly as shown by the dotted lines of FIGURE 2, and then downwardly so that the lower edge of the panel rests on the stop 12 so that the block E is supported at the proper elevation in the channel.

When it is desired to mount the telephone equipment on the wire terminal block E, the modesty panel C is detached by removing the screw fasteners 2. The top edge portion of the panel may be detachably held by an appropriate spring catch or by a conventional slip joint. After the required equipment has been mounted on the block, the wires may be led out of the aforesaid openings C′ at the upper corners of the modesty panel.

Referring to FIGURES 4 and 5, it will be observed that the slightly modified channels F′ which are secured by fastenings $F^2$ directly to a related side wall of the pedestal B. As shown in FIGURE 5, the web of the channel is provided at its upper end with an opening 7$^a$ which receives the fastenings $F^2$. The lower end of the web 7$^b$ is provided with an inwardly offset angular portion or hook 9 which may serve as a support for the bottom inturned flange of the modesty panel C by a slot in said flange fitting over the hook. Thus, the hook 9 and the slot detachably connect the bottom portion of the panel with the upper edge of the panel which is detachably connected to the desk top by the means previously described. Except for the hook, the channels F′ are the same as the channels F, having their flanges notched at 8$^a$ and also including the block means 12.

I claim:

1. An improvement in desks having a top and spaced pedestals together presenting horizontal and vertical wall portions constructed in fixed immovable relation and defining a knee space beneath the said top and pedestal walls, channel members permanently secured in vertical position to oppositely facing pedestal walls, a terminal block detachably mounted in said channel members, said channel members having top and bottom offset flanges and the medial opposite flanges thereof cut away to provide clearance for the terminal block when inserted generally transversely to the plane of the channels, and means in the web of said channels below the level of the cut-away portion to provide a rest for the lower edge of said block.

2. An improvement in desks, comprising, in combination, a top, spaced pedestals having inner walls, said top and pedestals together presenting horizontal and vertical wall portions constructed in fixed relation and defining a knee space beneath the said top and between said pedestals, channel members secured in vertical position to said facing inner pedestal walls, said channel members each having the medial portion of related opposite flanges thereof cut away, a block stop in said channel members below the level of the cut-away portions, and a terminal block adapted to be inserted in the channel members through said cut-away portions to be supported upon said block stop.

References Cited in the file of this patent

UNITED STATES PATENTS

| | | |
|---|---|---|
| 1,786,823 | Carrington | Dec. 30, 1930 |
| 1,821,674 | Shapiro | Sept. 1, 1931 |
| 1,845,385 | Zalenka | Feb. 16, 1932 |
| 1,892,414 | Ulrich | Dec. 27, 1932 |
| 1,892,415 | Ulrich | Dec. 27, 1932 |
| 2,387,506 | Freeman | Oct. 23, 1945 |
| 2,853,351 | Bassett | Sept. 23, 1958 |